(12) United States Patent
Hsiao et al.

(10) Patent No.: US 12,113,391 B2
(45) Date of Patent: Oct. 8, 2024

(54) POWER SUPPLY CONTROLLING SYSTEM (71) Applicants: Inventec Appliances (Pudong) Corporation, Shanghai (CN); Inventec Appliances Corporation, New Taipei (TW); Inventec Appliances (Shanghai) Co. Ltd., Shanghai (CN)

(72) Inventors: Cheng-Hsien Hsiao, New Taipei (TW); Hsin-Chang Yu, New Taipei (TW); Ming-Tsan Lin, New Taipei (TW)

(73) Assignees: Inventec Appliances (Pudong) Corporation, Shanghai (CN); Inventec Appliances Corporation, New Taipei (TW); Inventec Appliances (Shanghai) Co. Ltd., Shanghai (CN)

( * ) Notice: Subject to any disclaimer, the term of this patent is extended or adjusted under 35 U.S.C. 154(b) by 19 days.

(21) Appl. No.: 18/048,700

(22) Filed: Oct. 21, 2022

(65) Prior Publication Data
US 2023/0275448 A1 Aug. 31, 2023

(30) Foreign Application Priority Data
Feb. 25, 2022 (CN) .......................... 202210180414.1

(51) Int. Cl.
*H02J 7/00* (2006.01)
*H02J 7/34* (2006.01)
*H02M 3/155* (2006.01)

(52) U.S. Cl.
CPC ...... *H02J 7/007182* (2020.01); *H02J 7/0013* (2013.01); *H02J 7/34* (2013.01); *H02M 3/155* (2013.01); *H02J 2207/20* (2020.01)

(58) Field of Classification Search
CPC ...... H02J 7/007182; H02J 7/0013; H02J 7/34; H02J 7/00712; H02J 2207/20; H02J 1/10; H02M 3/155
See application file for complete search history.

(56) References Cited

U.S. PATENT DOCUMENTS 10,658,857 B2 * 5/2020 Zhao ...................... H02J 7/0068
10,737,586 B2 * 8/2020 Alves .................... H02J 7/0068

* cited by examiner

*Primary Examiner* — Jeffrey M Shin (57) ABSTRACT

A power supply controlling system is configured to supply power to a load and includes a first power supply device having a first outputting voltage and current to the load, a second power supply device having a second outputting voltage and current to the load, and a buck converter which is selectively connected to the first power supply device or the second power supply device first and is then connected in parallel with the power supply device without converter and the load. The buck converter is selectively connected to the power supply device with a higher voltage, and controls the output voltage of the converter to make it conform to the voltage of the other power supply device, so as to connect the two power supply devices in parallel and output current to the load.

8 Claims, 5 Drawing Sheets

POWER SUPPLY CONTROLLING SYSTEM

The present application is based on, and claims priority to China application No. 202210180414.1, filed on Feb. 25, 2022, the disclosure of which is hereby incorporated by reference herein in its entirety.

BACKGROUND OF THE INVENTION

Field of the Invention

The present invention relates to a controlling system, and more particularly, to a power supply controlling system capable of balancing the voltages of a plurality of power supply devices.

Description of the Prior Art

In recent years, with the rapid development of science and technology and the improvement of green energy awareness, electric vehicles that are driven by electricity instead of gasoline are gradually emerging. The power supply device of the electric vehicle is a battery, and the electric vehicle may contain several batteries to maintain the range of the electric vehicle.

Generally speaking, electric vehicles require large kinetic energy when starting, accelerating and climbing. Therefore, a power supply device of an electric vehicle usually connects several batteries in parallel, so that the power supply device can provide sufficient current and electric energy. However, the charge/discharge characteristics of each battery are not exactly the same and have voltage differences. When the batteries are directly connected in parallel, the power supply device will generate heat energy due to the internal circulation caused by the excessive voltage difference between the batteries, thereby reducing the endurance of the power supply device. In order to solve the shortcoming of the heating of the power supply device, the electric vehicle usually further includes a battery controlling switch to connect two sets of batteries to control the output and voltage of the batteries respectively.

In the existing battery control method, when the voltage of one of the batteries of the power supply device is higher, the battery controlling switch will turn on the battery with the higher voltage and cut off the battery with the lower voltage, so that the battery with the higher voltage can supply power alone to reduce the voltage of the battery. When the voltage difference of all the batteries of the power supply device is small, the battery controlling switch will turn on all the batteries to provide electrical energy in parallel. However, when a battery with a higher voltage is powered by itself, the battery may reduce the life of the battery due to excessive current output, thereby reducing the endurance and increasing the cost. Further, the battery controlling switch has only a switching function. When the battery controlling switch turns on all the batteries, the battery controlling switch cannot control the outputting current of the battery. Therefore, the battery may have internal impedance differences due to different battery characteristics. Low-impedance batteries will continue to provide electrical energy with high current and cannot distribute the outputting current of each battery. In addition, when the battery controlling switch turns on or off the battery, the power supply device is likely to generate inrush current, which may damage other electronic components of the electric vehicle, cause failure or reduce efficiency.

SUMMARY OF THE INVENTION

In view of this, the present invention provides a power supply controlling system to solve the problems of the prior art.

In an embodiment, the power supply controlling system of the present invention is configured for supplying power to a load, and the power supply controlling system comprises a first power supply device, a second power supply device and a buck converter. The first power supply device has a first outputting voltage and is configured for outputting a first outputting current to the load. The second power supply device has a second outputting voltage and is configured for outputting a second outputting current to the load. The buck converter is selectively connected in parallel with the first power supply device, the second power supply device and the load. The buck converter is configured for selectively adjusting the outputting voltages of the first power supply device and the second power supply device according to the first outputting voltage of the first power supply device, the second outputting voltage of the second power supply device and a load voltage of the load. When the first outputting voltage is greater than the second outputting voltage or the second outputting voltage is greater than the first outputting voltage, the buck converter balances the first outputting voltage and the second outputting voltage.

Wherein, the power supply controlling system of the present invention further comprises a controller connected to the buck converter. The buck converter comprises a first adjusting switch, a second adjusting switch and a third adjusting switch, and the controller is configured for controlling the first adjusting switch, the second adjusting switch and the third adjusting switch of the buck converter to adjust the outputting voltage of at least one of the first power supply device and the second power supply device.

Wherein, the second adjusting switch and the third adjusting switch respectively are one of a transistor and a diode.

Wherein, the controller is a pulse-width modulation (PWM) controller.

In an embodiment, the buck converter is disposed between the first power supply device and the second power supply device, and the second power supply device is disposed between the bulk converter and the load. When the first outputting voltage and the second outputting voltage are the same, the controller controls the first adjusting switch to completely turn on, so as to connect the first power supply device, the second power supply device and the load in parallel.

Wherein, when the first outputting voltage of the first power supply device is lower than the load voltage of the load, the controller controls the first adjusting switch and the third adjusting switch to turn off.

In an embodiment, the power supply controlling system of the present invention, further comprises a first circuit, a second circuit, a third circuit and a fourth circuit, comprises a first switch, a second switch, a third switch and a fourth switch respectively disposed in the first circuit, the second circuit, the third circuit and the fourth circuit, and comprises a switching controller connected to and controlling the first switch, the second switch, the third switch and the fourth switch. The bulk converter is disposed between the first power supply device and the load and between the second power supply device and the load. The first circuit is connected to the first power supply device, the bulk converter and the load, the second circuit is connected to the second power supply device and the load, the third circuit being connected to the first power supply device and the load, and the fourth circuit is connected to the second power supply device, the bulk converter and the load.

Wherein, when the first outputting voltage is greater than the second outputting voltage, the switching controller controls the first switch and the second switch to turn on, so that the first power supply device outputs the first outputting current through the first circuit, and the second power supply device outputs the second outputting current through the second circuit.

Wherein, when the second outputting voltage is greater than the first outputting voltage, the switching controller controls the third switch and the fourth switch to turn on, so that the first power supply device outputs the first outputting current through the third circuit, and the second power supply device outputs the second outputting current through the fourth circuit.

Wherein, when the first outputting voltage is equal to the second outputting voltage, the switching controller controls the second switch and the third switch to turn on, so that the first power supply device outputs the first outputting current through the third circuit, and the second power supply device outputs the second outputting current through the second circuit.

In summary, the power supply controlling system of the present invention can convert different voltages of power supply devices into the same outputting voltage through the controller and the buck converter, so as to avoid the return power loss caused by the voltage difference between the power supply devices to improve the endurance. In addition, the power supply controlling system of the present invention can also operate the power supply devices of the same voltage in parallel through the controller and the buck converter, thereby increasing the power supply. Furthermore, the power supply controlling system of the present invention can also control and balance the outputting voltages of a plurality of power supply devices by switching different circuits through the switching controller and the buck converter, thereby improving the endurance and power supply efficiency.

BRIEF DESCRIPTION OF THE APPENDED DRAWINGS

Some of the embodiments will be described in detail, with reference to the following figures, wherein like designations denote like members, wherein.

The advantages, spirits, and features of the present invention will be explained and discussed with embodiments and figures as follows.

DETAILED DESCRIPTION OF THE INVENTION

In order to make the advantages, spirit and features of the present invention easier and clearer, it will be detailed and discussed in the following with reference to the embodiments and the accompanying drawings. It is worth noting that the specific embodiments are merely representatives of the embodiments of the present invention, and the specific methods, devices, conditions, materials, etc. exemplified therein are not intended to limit the present invention or the corresponding specific embodiments. Rather, each device in the figure is only used to express its relative position and is not drawn according to its actual scale, and will be described together first.

In the description of the present invention, it should be understood that the orientation or positional relationship indicated by the terms "longitudinal, lateral, upper, lower, front, rear, left, right, top, bottom, inner, outer" etc. is based on the orientation or positional relationship shown in the accompanying drawings, it is only to facilitate the description of the present invention and to simplify the description and not to indicate that a device or element described must have a particular orientation, be constructed and operate in the particular orientation. Therefore, it should not be construed as a limitation of the present invention.

Figure 1:
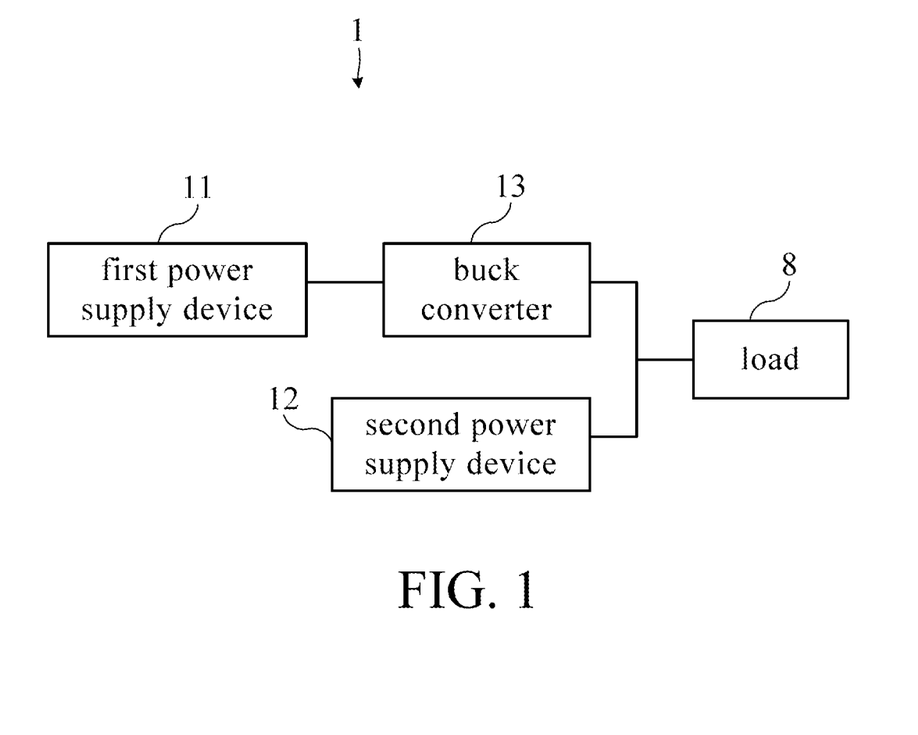
FIG. 1 shows a functional block diagram of a power supply controlling system according to an embodiment of the present invention.
Figure 2:
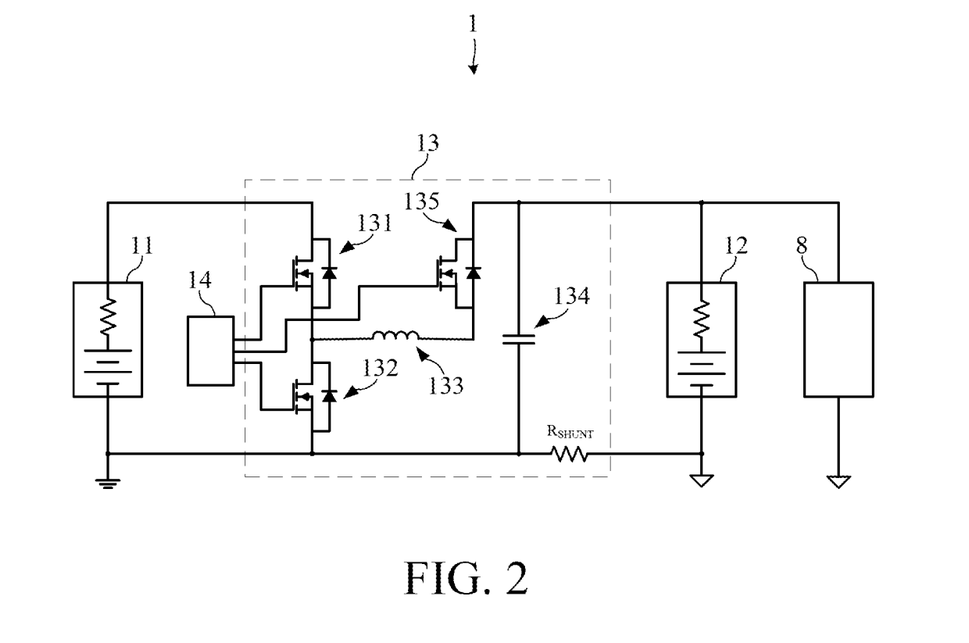
FIG. 2 shows a circuit diagram of the power supply controlling system according to the embodiment of the FIG. 1.

Please refer to FIG. 1 and FIG. 2. FIG. 1 shows a functional block diagram of a power supply controlling system 1 according to an embodiment of the present invention. FIG. 2 shows a circuit diagram of the power supply controlling system 1 according to the embodiment of the FIG. 1. As shown in FIG. 1, in this embodiment, the power supply controlling system 1 comprises a first power supply device 11, a second power supply device 12 and a buck converter 13, and the power supply controlling system 1 is configured for supplying power to a load 8. The first power supply device 11 has a first outputting voltage and is configured for outputting a first outputting current to the load 8. The second power supply device 12 has a second outputting voltage and is configured for outputting a second outputting current to the load 8. The buck converter is configured for selectively adjusting the outputting voltages of the first power supply device 11 and the second power supply device 12 according to the first outputting voltage of the first power supply device 11, the second outputting voltage of the second power supply device 12 and a load voltage of the load 8.

In practice, the power supply controlling system 1 of the present invention can be applied to electric vehicles. The first power supply device 11 and the second power supply device 12 can be batteries. The buck converter 13 can be integrated on the main control board or the circuit board of the power supply module. The load 8 can be a power device such as a motor controller of an electric vehicle. Further, the main control board or the circuit board of the power supply module can be connected to the first power supply device 11, the second power supply device 12 and the load 8 to control the first power supply device 11 and the second power supply device 12 to provide electrical energy to the load 8 so as to make the load 8 operate.

As shown in FIG. 1 and FIG. 2, in this embodiment, the buck converter 13 is disposed between the first power supply device 11 and the second power supply device 12, and the second power supply device 12 is disposed between the first power supply device 11 and the load 8. The buck converter 13 is configured to adjust the outputting voltage of the first power supply device 11 according to the first outputting voltage of the first power supply device 11, the second outputting voltage of the second power supply device 12 and the load voltage of the load 8. Further, the buck converter 13 comprises a first adjusting switch 131, a second adjusting switch 132 and a third adjusting switch 135, and the power supply controlling system 1 further comprises a controller 14 connected to the first adjusting switch 131, the second adjusting switch 132 and the third adjusting switch 135 of the buck converter 13. The controller 14 is configured to control the turn-on and turn-off of the first adjusting switch 131, the second adjusting switch 132 and the third adjusting switch 135 of the buck converter to adjust the outputting voltage of the first power supply device 11. In practice, the first adjusting switch 131, the second adjusting switch 132 and the third adjusting switch 135 can be transistors. Further, the first adjusting switch 131 and the second adjusting switch 132 may be Metal-Oxide-Semiconductor Field-Effect Transistor (MOSFET). The controller 14 can be a pulse-width modulation (PWM) controller, and the controller 14 can be integrated on the main control board or the circuit board of the power supply module.

In practice, the power supply controlling system 1 further comprises a voltage detector (not shown in FIG.) connected to the first power supply device 11, the second power supply device 12, the load 8 and the controller 14. In practice, the voltage detector can also be integrated on the main control board or the circuit board of the power supply module. The voltage detector is configured to detect the first outputting voltage of the first power supply device 11, the second outputting voltage of the second power supply device 12 and the load voltage of the load 8. Therefore, the controller 14 can control the first adjusting switch 131 according to the first outputting voltage and the second outputting voltage measured by the voltage detector.

As shown in FIG. 2, when the first outputting voltage of the first power supply device 11 is greater than the second outputting voltage of the second power supply device 12, the controller 14 can control the first adjusting switch 131, the second adjusting switch 132 and the third adjusting switch 135 of the buck converter 13 to adjust the outputting voltage of the buck converter 13. In practice, when the controller 14 controls the first adjusting switch 131 and the third adjusting switch 135 to turn on and controls the second adjusting switch 132 to turn off, the first power supply device 11 can output the first outputting current to the buck converter 13. At this time, the buck converter 13 can increase the first outputting current by passing the electric energy of the power supply device 11 through an inductor 133 and a capacitor 134, thereby reducing the first outputting voltage of the first power supply device 11. Further, the controller 14 can control the duty cycle of the first adjusting switch 131 to control the flow of the first outputting current. Then, the first outputting voltage of the first power supply device 11 is adjusted to balance the first outputting voltage and the second outputting voltage with each other. Therefore, the power supply controlling system of the present invention can convert power supply devices of different voltages into the same outputting voltage through the controller and the buck converter. In this way, the voltage difference between the power supply devices is avoided to cause backflow, which causes power loss and temperature rise, thereby improving the endurance.

When the first outputting voltage of the first power supply device 11 and the second outputting voltage of the second power supply device 12 are the same, the controller 14 controls the first adjusting switch 131 to be fully turned on. Thereby, the first power supply device 11, the second power supply device 12 and the load 8 are connected in parallel. In practice, when the first outputting voltage and the second outputting voltage are the same, the controller 14 can control the first adjusting switch 131 and the third adjusting switch 135 to be completely turned on. Thereby, the first outputting current of the first power supply device 11 can completely pass through the buck converter 13 and flow to the inductor 133 and the capacitor 134 of the buck converter 13. Further, the voltages of the first power supply device 11 and the second power supply device 12 are similar. When the inductor 133 is saturated due to a large current, the inductor 133 will act as a short circuit. Thereby, the outputting current of the first power supply device 11 is connected in parallel with the inductor 133, the second power supply device 12 and the load 8 via the first adjusting switch 131. In practice, when the electric vehicle starts, accelerates and climbs a slope, the first power supply device 11 and the second power supply device 12 can supply power to the load 8 at the same time, so as to increase the outputting power. Therefore, the power supply controlling system of the present invention can also operate the power supply devices of the same voltage in parallel through the controller and the buck converter, thereby improving the power supply capability and efficiency.

Further, when the first outputting voltage of the first power supply device 11 is lower than the load voltage of the load 8, the controller 14 controls the first adjusting switch 131, the second adjusting switch 132 and the third adjusting switch 135 to be turned off. In practice, when the first outputting voltage of the first power supply device 11 is lower than the outputting voltage of the second power supply device 12 and the load 8, it means that the first power supply device 11 cannot provide the first outputting current to the load 8. Therefore, the controller 14 controls the third adjusting switch 135 to be turned off. At this time, only the second power supply device 12 provides current to the load 8. However, once the outputting voltage of the second power supply device 12 is reduced to the same or lower than the outputting voltage of the first power supply device 11 due to the output of a large current, the buck converter 13 will start up again, so that the first power supply device 11 and the second power supply device 12 are supplied in parallel together.

In an embodiment, the controller 14 can control the turn-on duty cycle of the first adjusting switch 131, and during the off period of the first adjusting switch 131, the controller 14 controls the second adjusting switch 132 to turn on. In practice, when the inductor 133 and the capacitor 134 of the buck converter 13 provide current to the load 8, the controller 14 can control the second adjusting switch 231 to be turned on to provide a discharge loop for the inductor 133. Then, the stored energy on the inductor 133 is released to the capacitor 134 and the load 8 to prevent the inductor 133 from inducing a surge voltage and damaging the circuit.

Figure 3:
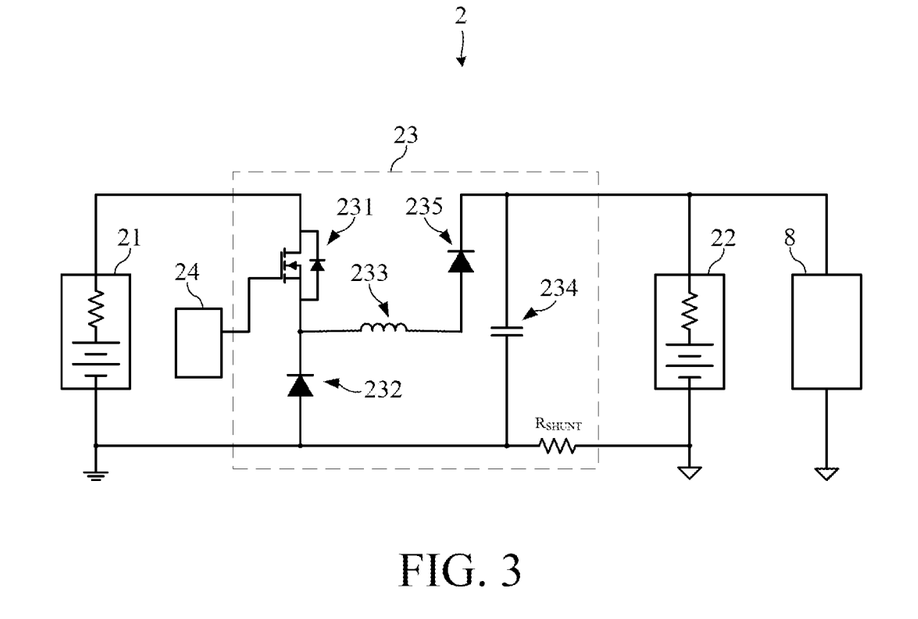
FIG. 3 shows a circuit diagram of the power supply controlling system according to an embodiment of the present invention.

The second adjusting switch of the buck converter is not limited to the transistor in the foregoing embodiment, and the second adjusting switch can also be in other forms. Please refer to FIG. 3. FIG. 3 shows a circuit diagram of the power supply controlling system 2 according to an embodiment of the present invention. As shown in FIG. 3, in this embodiment, the second adjusting switch 232 and the third adjusting switch 235 are diodes, and the controller 24 can control the first adjusting switch 231 of the buck converter 23 to adjust the outputting voltage of the first power supply device 21. In practice, when the first outputting voltage of the first power supply device 21 is greater than the second outputting voltage of the second power supply device 22, the controller 24 controls the first adjusting switch 231 to be turned on. At this time, the second adjusting switch 232 is reverse biased, and the third adjusting switch 235 is forward biased. Therefore, the first outputting current of the first power supply device 21 does not flow to the second adjusting switch 232 but flows through the inductor 233, the third adjusting switch 235, the capacitor 234 and the load 8. The voltage difference between the first power supply device 21 and the second power supply device 22 is borne by the inductor 233, so that the outputting voltage of the buck converter 23 is the same as that of the second power supply device 22. When the first outputting voltage of the first power supply device 21 is lower than the voltage between the second power supply device 22 and the load 8, the third adjusting switch is turned off due to the reverse bias voltage, and the current of the second power supply device 22 will not flow back to the first power supply device 21 to generate circulation.

Figure 4:
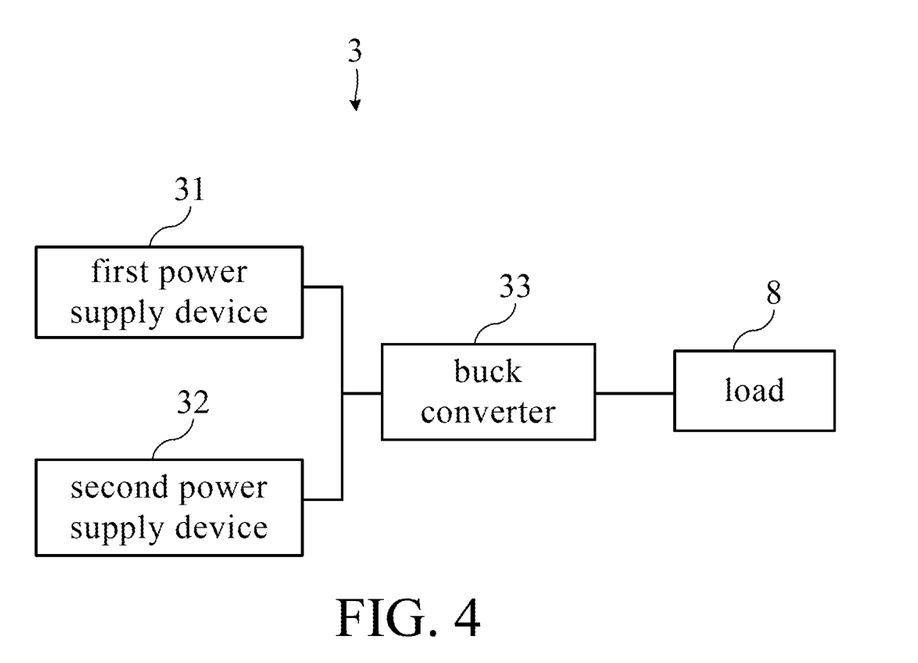
FIG. 4 shows a functional block diagram of a power supply controlling system according to another embodiment of the present invention.
Figure 5:
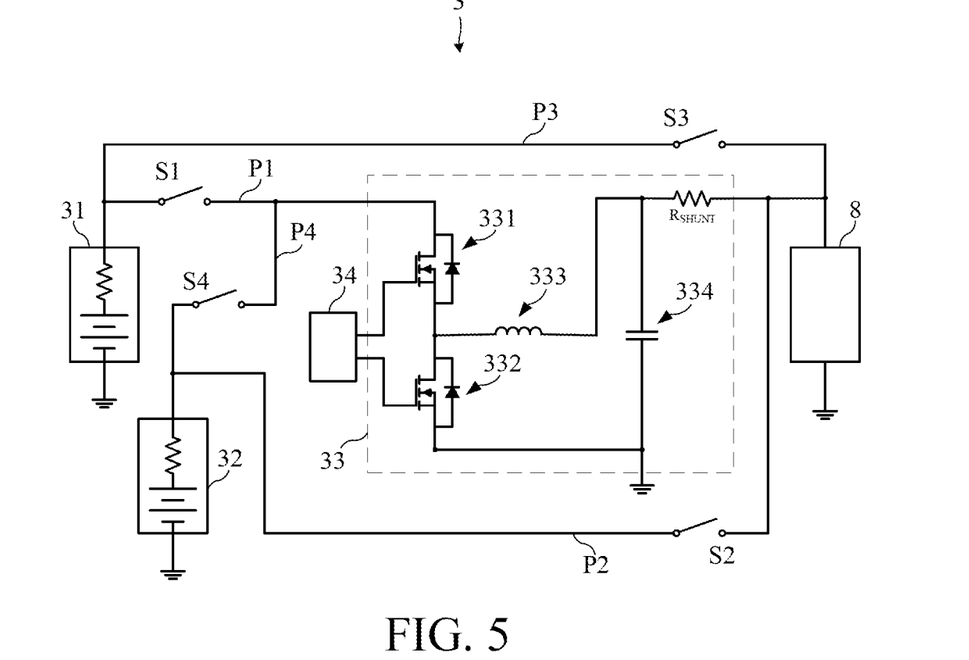
FIG. 5 shows a circuit diagram of the power supply controlling system according to the embodiment of the FIG. 4.

The power supply controlling system of the present invention, in addition to the aspects of the foregoing embodiments, may also be in other aspects. Please refer to FIG. 4 and FIG. 5. FIG. 4 shows a functional block diagram of a power supply controlling system 3 according to another embodiment of the present invention. FIG. 5 shows a circuit diagram of the power supply controlling system 3 according to the embodiment of the FIG. 4. As shown in FIG. 4 and FIG. 5, the difference between the present embodiment and the foregoing embodiments is that the first power supply device 31 and the second power supply device 32 are both connected to the buck converter 33. That is, the buck converter 33 is disposed between the first power supply device 31 and the load 8 and between the second power supply device 32 and the load 8. Therefore, the first power supply device 31 and the second power supply device 32 can output current to the load 8 through the buck converter 33. Please note that the functions of the first adjusting switch 331, the second adjusting switch 332, the inductor 333, the capacitor 334, and the controller 34 of the buck converter 33 in this embodiment are the same as the function of the corresponding element in the previous embodiment, and details are not described herein again.

As shown in FIG. 5, in this embodiment, the power supply controlling system 3 comprises a first circuit P1, a second circuit P2, a third circuit P3 and a fourth circuit P4. The first circuit P1 is connected to the first power supply device 31, the buck converter 33 and the load 8. The second circuit P2 is connected to the second power supply device 32 and the load 8. The third circuit P3 is connected to the first power supply device 31 and the load 8. The fourth circuit P4 is connected to the second power supply device 32, the buck converter 33 and the load 8. Further, the power supply controlling system 3 comprises a first switch S1, a second switch S2, a third switch S3 and a fourth switch S4 respectively disposed on the first circuit P1, the second circuit P2, the third circuit P3 and the fourth circuit P4. The power supply controlling system 3 can adjust the outputting modes of the first power supply device 31 and the second power supply device 32 through the switching of the first switch S1, the second switch S2, the third switch S3 and the fourth switch S4. In practice, the power supply controlling system 3 may further comprise a switching controller (not shown in FIG.) connected to and controlling the first switch S1, the second switch S2, the third switch S3 and the fourth switch S4. The switching controller can be integrated on the main control board or the circuit board of the power supply module, and can also be connected with a voltage detector.

In practice, when the first outputting voltage of the first power supply device 31 is greater than the second outputting voltage of the second power supply device 32, the switching controller controls the first switch S1 and the second switch S2 to be turned on, and controls the third switch S3 and the fourth switch S4 to be turned off. At this time, the first power supply device 31 outputs the first outputting current with the first circuit P1, and the second power supply device 32 outputs the second outputting current with the second circuit P2. When the first outputting current of the first power supply device 31 flows through the first circuit P1, the first power supply device 31 can adjust the first outputting voltage through the buck converter 33, so that the first outputting voltage of the first power supply device 31 and the second outputting voltage of the second power supply device 32 are balanced with each other. The first power supply device 31, the buck converter 33, the second power supply device 32 and the load 8 are connected in parallel. Therefore, the first power supply device 31 and the second power supply device 32 can simultaneously output current to the load 8 under the condition of the same outputting voltage.

When the second outputting voltage of the second power supply device 32 is greater than the first outputting voltage of the first power supply device 31, the switching controller controls the third switch S3 and the fourth switch S4 to be turned on, and controls the first switch S1 and the second switch S2 to be turned off. At this time, the first power supply device 31 outputs the first outputting current with the third circuit P3, and the second power supply device 32 outputs the second outputting current with the fourth circuit P4. When the second outputting current of the second power supply device 32 flows through the fourth circuit P4, the second power supply device 32 can adjust the second outputting voltage through the buck converter 33. Thereby, the first outputting voltage of the first power supply device 31 and the second outputting voltage of the second power supply device 32 are balanced with each other. In addition, the first power supply device 31, the second power supply device 32, the buck converter 33 and the load 8 are connected in parallel. Therefore, the first power supply device 31 and the second power supply device 32 can simultaneously output current to the load 8 under the condition of the same outputting voltage.

When the first outputting voltage of the first power supply device 31 is equal to the second outputting voltage of the second power supply device 32, it means that neither the first power supply device 31 nor the second power supply device 32 need to adjust the first outputting voltage and the second outputting voltage. At this time, the switching controller controls the second switch S2 and the third switch S3 to be turned on, and controls the first switch S1 and the fourth switch S4 to be turned off. Therefore, the first power supply device 31 outputs the first outputting current through the third circuit P3, the second power supply device 32 outputs the second outputting current through the second circuit P2. In addition, the first power supply device 31, the second power supply device 32 and the load 8 are connected in parallel, and the first power supply device 31 and the second power supply device 32 can output current to the load 8 at the same time.

In practice, when electric vehicles are replaced with batteries and are running, the switching controller can switch the switch at any time through the first outputting voltage of the first power supply device 31 and the second outputting voltage of the second power supply device 32 measured by the switching controller. In this way, the first outputting voltage and the second outputting voltage are maintained in a balanced state. While the voltages of the first power supply device and second power supply device are similar and the electric vehicle accelerates and climbs a slope, the switching controller can also respectively control the first power supply device 31 and the second power supply device 32 to directly supply power to the load 8 through the third circuit P3 and the second circuit P2 to increase the outputting power. Further, while the electric vehicle is running downhill, the switching controller can also switch to the second circuit P2 and the third circuit P3. In this way, the load 8 can control the charging current of the first power supply device 31 and the second power supply device 32 through the buck converter 33. Therefore, the power supply controlling system of the present invention can also control the outputting voltages of a plurality of power supply devices by switching the switches, thereby improving the endurance and power supply efficiency.

In summary, the power supply controlling system of the present invention can convert power supply devices of different voltages into the same outputting voltage through the controller and the buck converter. In this way, the circulating current caused by the voltage difference between the power supply devices which will result in power loss and temperature rise is avoided, thereby improving the endurance. In addition, the power supply controlling system of the present invention can also operate the power supply devices of the same voltage in parallel through the controller and the buck converter, thereby improving the power supply efficiency.

With the detailed description of the above embodiments, it is hoped that the features and spirit of the present invention can be more clearly described, and the scope of the present invention is not limited by the embodiments disclosed above. On the contrary, the intention is to cover various changes and equivalent arrangements within the scope of the patents to be applied for in the present invention. Therefore, the scope of the patentable scope for which the present invention is claimed should be construed in the broadest sense in accordance with the above description so as to encompass all possible modifications and equivalent arrangements.

What is claimed is:

1. A power supply controlling system for supplying power to a load, the power supply controlling system comprising:
    a first power supply device having a first outputting voltage and configured for outputting a first outputting current to the load;
    a second power supply device having a second outputting voltage and configured for outputting a second outputting current to the load;
    a buck converter selectively connected in parallel with the first power supply device, the second power supply device and the load, the buck converter being configured for selectively adjusting the outputting voltages of the first power supply device and the second power supply device according to the first outputting voltage of the first power supply device, the second outputting voltage of the second power supply device and a load voltage of the load, the buck converter comprising a first adjusting switch, a second adjusting switch and a third adjusting switch, wherein the buck converter is disposed between the first power supply device and the second power supply device, and the second power supply device is disposed between the buck converter and the load; and
    a controller connected to the buck converter, the controller being configured for controlling the first adjusting switch, the second adjusting switch and the third adjusting switch of the buck converter to adjust the outputting voltage of at least one of the first power supply device and the second power supply device;
    wherein when the first outputting voltage is greater than the second outputting voltage or the second outputting voltage is greater than the first outputting voltage, the buck converter balances the first outputting voltage and the second outputting voltage for the first power supply device and the second power supply device to provide the first outputting current and the second outputting current to the load at the same time;
    wherein when the first outputting voltage and the second outputting voltage are the same, the controller controls the first adjusting switch to completely turn on, so as to connect the first power supply device, the second power supply device and the load in parallel.

2. The power supply controlling system of claim 1, wherein the second adjusting switch and the third adjusting switch respectively are one of a transistor and a diode.

3. The power supply controlling system of claim 1, wherein the controller is a pulse-width modulation (PWM) controller.

4. The power supply controlling system of claim 1, wherein when the first outputting voltage of the first power supply device is lower than the load voltage of the load, the controller controls the first adjusting switch and the third adjusting switch to turn off.

5. The power supply controlling system of claim 1, further comprising a first circuit, a second circuit, a third circuit and a fourth circuit, comprising a first switch, a second switch, a third switch and a fourth switch respectively disposed in the first circuit, the second circuit, the third circuit and the fourth circuit, and comprising a switching controller connected to and controlling the first switch, the second switch, the third switch and the fourth switch, the buck converter being disposed between the first power supply device and the load and between the second power supply device and the load, the first circuit being connected to the first power supply device, the buck converter and the load, the second circuit being connected to the second power supply device and the load, the third circuit being connected to the first power supply device and the load, and the fourth circuit being connected to the second power supply device, the buck converter and the load.

6. The power supply controlling system of claim 5, wherein when the first outputting voltage is greater than the second outputting voltage, the switching controller controls the first switch and the second switch to turn on, so that the first power supply device outputs the first outputting current through the first circuit, and the second power supply device outputs the second outputting current through the second circuit.

7. The power supply controlling system of claim 5, wherein when the second outputting voltage is greater than the first outputting voltage, the switching controller controls the third switch and the fourth switch to turn on, so that the first power supply device outputs the first outputting current through the third circuit, and the second power supply device outputs the second outputting current through the fourth circuit.

8. The power supply controlling system of claim 5, wherein when the first outputting voltage is equal to the second outputting voltage, the switching controller controls the second switch and the third switch to turn on, so that the first power supply device outputs the first outputting current through the third circuit, and the second power supply device outputs the second outputting current through the second circuit.

* * * * *